United States Patent [19]
Bucher et al.

[11] Patent Number: 5,893,921
[45] Date of Patent: Apr. 13, 1999

[54] METHOD FOR MAINTAINING MEMORY COHERENCY IN A COMPUTER SYSTEM HAVING A CACHE UTILIZING SNOOP ADDRESS INJECTION DURING A READ TRANSACTION BY A DUAL MEMORY BUS CONTROLLER

[75] Inventors: Timothy Bucher, Los Altos; Douglas Christopher Hester, Milpitas; John Victor Sell, Los Altos, all of Calif.; Cang N. Tran, Austin, Tex.

[73] Assignee: International Business Machines Corporation, Armonk, N.Y.

[21] Appl. No.: 08/387,148

[22] Filed: Feb. 10, 1995

[51] Int. Cl.⁶ ............................. G06F 13/16; G06F 13/40
[52] U.S. Cl. ........................ 711/146; 711/141; 395/308
[58] Field of Search .................................. 395/473, 468, 395/308, 800, 878; 364/DIG. 1

[56] References Cited

U.S. PATENT DOCUMENTS

| | | |
|---|---|---|
| 5,072,369 | 12/1991 | Theus et al. . |
| 5,119,485 | 6/1992 | Ledbetter, Jr. et al. ............... 711/146 |
| 5,157,774 | 10/1992 | Culley . |
| 5,228,134 | 7/1993 | MacWilliams et al. . |
| 5,228,135 | 7/1993 | Ikumi . |
| 5,293,603 | 3/1994 | MacWilliams et al. . |
| 5,325,511 | 6/1994 | Collins et al. . |
| 5,341,487 | 8/1994 | Derwin et al. ......................... 711/146 |
| 5,353,415 | 10/1994 | Wolford et al. . |
| 5,359,723 | 10/1994 | Mathews et al. ...................... 711/122 |
| 5,394,555 | 2/1995 | Hunter et al. ........................ 711/148 |
| 5,426,765 | 6/1995 | Stevens et al. ....................... 711/131 |
| 5,463,753 | 10/1995 | Fry et al. ............................ 711/146 |

OTHER PUBLICATIONS

IBM Technical Disclosure Bulletin, "System Bus Tag Ram", vol. 32, No. 8B, Jan. 1990, pp. 288–290.

*Primary Examiner*—Tod R. Swann
*Assistant Examiner*—J. Peikari
*Attorney, Agent, or Firm*—Casimer K. Salys; Andrew J. Dillon

[57] ABSTRACT

A method for maintaining memory coherency in a data processing system is disclosed. The data processing system includes a memory system having a dual bus memory controller, which is coupled to a first bus through a first bus master and a second bus coupled to a second bus master. The method maintains memory coherency by snooping across either the first or second bus for attributes on an address/data multiplex bus in the data processing unit. To determine when a snoop operation is required, the system begins by requesting access to either of the two buses through the dual bus memory controller. Once the control of the bus has been granted upon request data is transferred using the master bus controller. It is upon the receipt of an invalid data signal while transferring data across the bus that the snoop activity begins. The snoop is injected only after an invalid data signal is received and a last snoop injection can occur only before a last read data is read.

8 Claims, 4 Drawing Sheets

1

METHOD FOR MAINTAINING MEMORY COHERENCY IN A COMPUTER SYSTEM HAVING A CACHE UTILIZING SNOOP ADDRESS INJECTION DURING A READ TRANSACTION BY A DUAL MEMORY BUS CONTROLLER

BACKGROUND OF THE INVENTION

1. Technical Field

The present invention relates in general to data storage systems, and more specifically, to data storage systems having a cache unit either within or without a processing unit. Additionally, the present invention relates specifically to a data storage system having a cache unit with memory coherency maintained by an improved snooping scheme.

2. Description of the Related Art

Many computer systems today include several levels of memory storage that attempt to fill the conflicting needs of the computer system. For example, computer systems are designed to operate very fast and memory is needed to operate at the same speed as the processing unit used within the computer system. Unfortunately, the cost of fast memory elements approach those of the cost of the microprocessor itself, thus, driving up the cost of the system overall if the fastest memory available is to be used. A compromise is to use slower but less expensive memory units for specific applications. One such application is to use slower dynamic ram memory for holding information temporarily before the processor unit needs to use it. Another alternative is to use a fast, but small and expensive, caching unit that operates at the same speed as the processing unit. Since this caching unit is small in comparison to the larger short-term memory, it is inexpensive to add with respect to the overall cost of the computer system. Lastly, a very large long-term storage unit is usually supplied, such as a hard disk drive, which is relatively inexpensive compared with the other types of memory.

Unfortunately, having different types of memory and different sorts of memory locations causes management problems for the memory controller to maintain the most current and accurate data needed or processed by the processing unit or any other resource connected to the computing system, such as a peripheral device. Accordingly, the processing system must maintain memory coherency among the various types of memory units used.

The primary objective of a coherent memory system is to provide the same image of memory to all devices using the system. Coherency allows synchronization and cooperative use of shared resources, otherwise, multiple copies of a memory location, some containing stale values, could exist in a system resulting in errors when the stale values are used. Each potential bus master within the system must follow rules for managing the state of its cache.

One type of cache coherency protocol is a coherent subset of the standard MESI four-state protocol that omits the shared state. Since data cannot be shared, the processor signals all cache block fills as if they were write misses (read-with-intent-to-modify), which flushes the corresponding copies of the data in all caches external to the processor prior to the processor's cache block fill operation. Following the cache block load, the processor is the exclusive owner of the data and may write to it without a bus broadcast transaction.

To maintain this coherency, all global reads observed on the bus by the processor are snooped as if they were writes,

2 causing the processor to write a modified cache block back to memory and invalidate the cache block, or simply invalidate the cache block if it is unmodified.

One problem when there is a multiplex bus is that no snoop cycles can be performed during a read transaction. For example, in a dual bus architecture, having a system memory controller, the system memory controller has to wait for the completion of the current read transaction of a master one bus. Then, the memory controller allows another master connected to the second bus to access system memory to ensure memory consistency or coherency.

Accordingly, what is needed is a bus protocol for a processing system having a multiplexed bus and more than one bus master or a dual bus memory controller that controls coherency by providing snoop operations during a data phase or read transaction.

SUMMARY OF THE INVENTION

It is therefore one object of the present invention to provide data storage systems.

It is another object of the present invention to provide data storage systems having a cache unit either within or without a processing unit.

It is yet another object of the present invention to provide a data storage system having a cache unit with memory coherency maintained by an improved snooping scheme.

The foregoing objects are achieved as is now described. According to the present invention, a method for maintaining memory coherency in a data processing system is disclosed. The data processing system includes a memory system having a dual bus memory controller, which is coupled to a first bus through a first bus master and a second bus coupled to a second bus master. The method maintains memory coherency by snooping across either the first or second bus for attributes on an address/data multiplex bus in the data processing unit. To determine when a snoop operation is required, the system begins by requesting access to either of the two buses through the dual bus memory controller. Once the control of the bus has been granted to upon request data is transferred using the master bus controller. It is upon the receipt of an invalid data signal while transferring data across the bus that the snoop activity begins. The snoop is injected only after an invalid data signal is received and a last snoop injection can occur only before a last read data is read.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
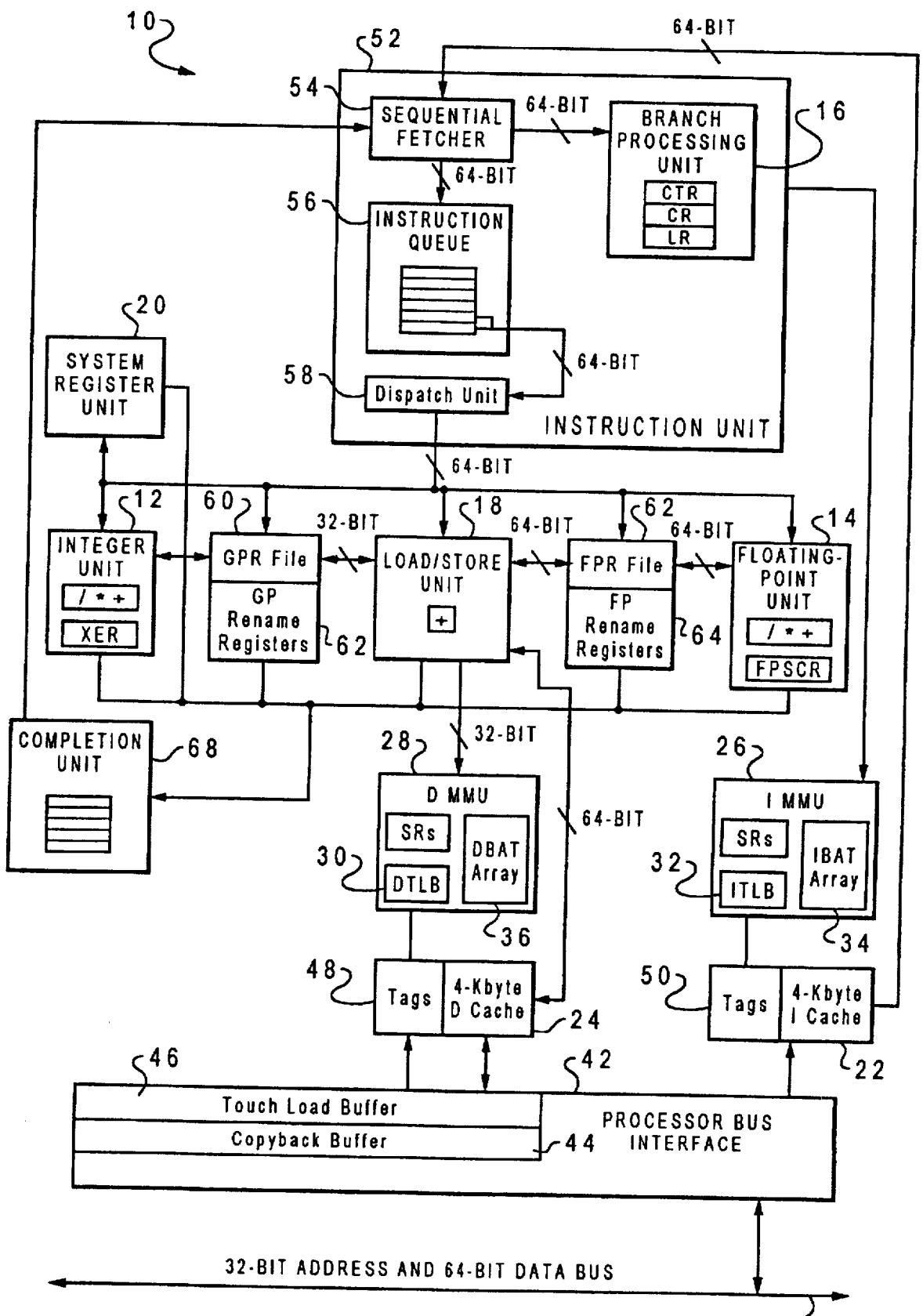
FIG. 1 depicts a block diagram of a representative microprocessor upon which the present invention is implemented.

FIG. 1 depicts a block diagram of a representative microprocessor 10 upon which the present invention is implemented. Microprocessor 10 may be selected from, for example, the family of PowerPC RISC Processors. This particular microprocessor 10 implements a 32-bit architecture, which provides 32-bit effective addresses and floating point data types of 32 and 62 bits. Significantly, the processor can issue and retire as many as three instructions per clock cycle, which instructions may be executed out-of-order for increased performance, but with completion appearing sequential for coherent and systematic operation.

Microprocessor 10 also includes five execution units, integer unit (IU) 12, floating point unit (FPU) 14, branch processing unit (BPU) 16, load-store unit (LSU) 18, and system register unit (SRU) 20. Microprocessor 10 also includes two physically addressed caches, one is an instruction cache 22 and the other is a data cache 24. Both caches are two-way set associative caches. Two memory management units (MMUs) are further included and consist of instruction MMU 26 and data MMU 28. Both MMUs contain 64-entry two-way set associative, data and instruction translation look aside buffers (DTLB and ITLB), 30 and 32, respectively, that provide support for demand-paged virtual memory addressed translation and variable-sized block translation. Microprocessor 10 also supports block address translation through the use of two independent instruction and data block address translation (IBAT and DBAT) arrays 34 and 36 of four entries each. Effective addresses are compared simultaneously with all four entries in the BAT array 34 and 36 during block translation.

Microprocessor 10 also includes a selectable multiplexed 32-bit address and 64-bit data bus 38. The interface protocol for microprocessor 10 allows multiple masters to compete for system resources through a central external arbiter. Bus 38 is connected to processor bus interface 42, which includes a copy-back buffer 44 and a touch load buffer 46. Processor bus interface 42 is further connected to the instruction cache 22, data cache 24, and tags unit 48 and 50, which are connected to data cache 24 and instruction cache 22, respectively. Instruction cache 22 is further connected to instruction unit 52 while data cache 24 is connected to the load/store unit 18. Both instruction and data caches 22 and 24 are further connected to their respective memory management units 30 and 28 via their tags unit 48 and 50. Instruction fetching and issuing is handled in instruction unit 52. Translation of address for cache or external memory accesses is handled by the MMUs 28 and 30.

Instruction unit 52 also includes a sequential fetcher 54, instruction queue 56, dispatch unit 58 and batch processing unit 16, to provide centralized control of instruction flow to the execution units. Instruction unit 52 determines the address of the next instruction to be fetched based on information from the sequential fetcher 54 and from BPU 16.

Instruction unit 52 fetches instructions from instruction cache 22 into queue 56. BPU 16 extracts branch instructions from sequential fetcher 54 and uses static branch prediction on unresolved conditional branches to allow the instruction unit to fetch instructions from a predicted target instruction stream while a conditional branch is evaluated. Instruction queue 56 is designed to hold more than one instruction and can load more than one instruction from instruction unit 52 during a single cycle. Fetcher 54 continuously loads as many instructions as space in the instruction queue allows. Dispatch unit 58 performs source and destination register dependency checking, determines dispatch serializations, and inhibits subsequent instruction dispatching as required.

Branch processing unit 16 receives branch instructions from fetcher 54 performs CR lookahead operations on conditional branches to resolve those branches early, achieving the effect of a zero cycle branch in many cases.

Load/store unit 18 executes all load and store instructions and provides the data transfer interface between general purpose registers (GPRs) 60, floating point registers (FPRS) 62, and the cache/memory subsystem. Load/store unit 18 calculates effective addresses, performs data alignment and provides sequencing for load/store string and multiple instructions. Load and store instructions are issued and translated in program order; however, the actual memory accesses can occur out-of-order. Synchronizing instructions are provided to enforce strict ordering.

Cacheable loads, when free of data dependencies, execute in a speculative manner with a maximum throughput of once per cycle and a two-cycle total latency. Data removed from the cache is held in rename registers 64 and 66 until completion unit 68 commits the value to a GPR or FPR. Stores cannot be executed speculatively and are held in the store queue until completion unit 68 signals that the store operation is to be completed to memory. The time required to perform the actual load or store operation varies depending on whether the operation involves the cache, system memory, or an I/O device.

MMUs 34 and 36 support both virtual memory and physical memory for instruction and data. MMUs 34 and 36 also control access privileges for the spaces on block and page granularities. LSU 18 calculates effective addresses for data loads and stores, performs data alignment to and from cache memory, and provides the sequencing for load and store string and multiple word instructions. The instruction unit 52 calculates the effective addresses for instruction fetching.

After an address is generated, the higher-order bits of the effective address are translated by the appropriate MMU into physical address bits. Simultaneously, the lower-order address bits are directed to the caches where they form the index into the two-way set associative tag array. After translating the address, the MMU passes the higher-order bits of the physical address to the cache, and the cache lookup completes.

Cache units 22 and 24 each have a line size of 32 bits in length and provides a 64-bit interface to instruction fetcher 54 and load/store unit 18, respectively. The surrounding logic or tags 48 and 50, select, organize, and forward the pre-requested information to the requesting unit. Write operation to the cache can be performed on a byte basis, and a complete read-modify-write operation to the cache can occur in each cycle. Both load/store unit 18 and instruction fetcher 54 provide caches 24 and 22 with the address of the data or instruction to be fetched. In the case of a cache hit, the cache returns two words to the requesting unit.

The data cache tags 48 are single ported, and thus simultaneous load or store and snoop accesses cause can resource contention. Snoop accesses have the highest priority and are given first accesses to tags 48, 21 unless the snoop access coincides with a tag write, in which case the snoop is retried and must be rearbitrated for access to the cache. Load or stores that are deferred due to snoop accesses are executed on the clock cycle following the snoop.

Figure 2:
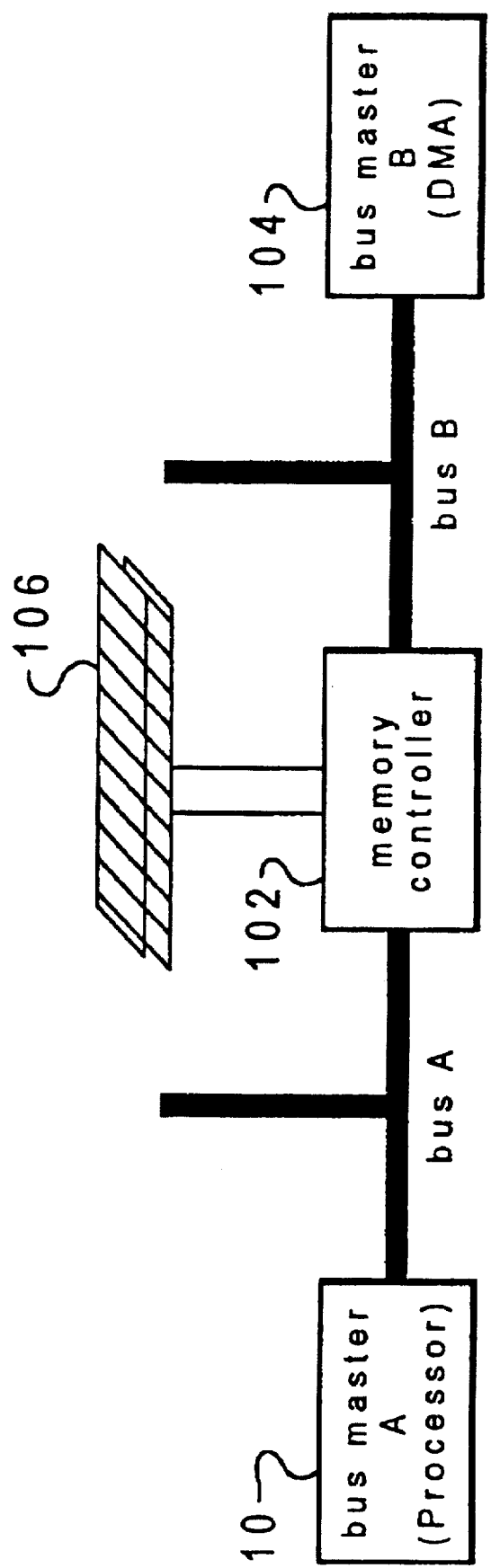
FIG. 2 is a block diagram of a memory system, coupled to a processing unit of FIG. 1.

FIG. 2 is a block diagram of a memory system 100, coupled to a first bus master A or processing unit 10 of FIG.

Figure 3:
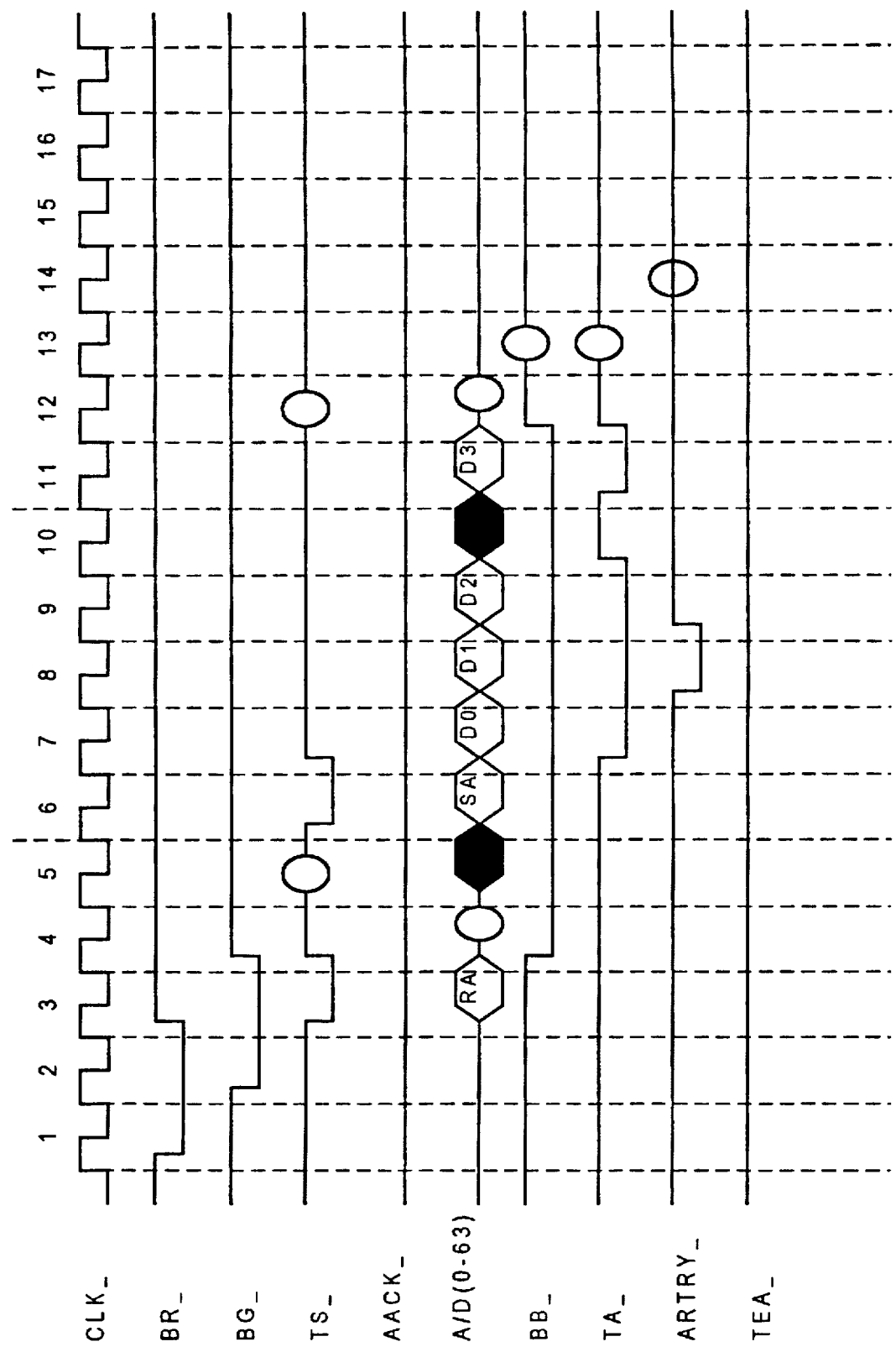
FIG. 3 illustrates a timing diagram for a first snoop in an injected snoop window.

1. Memory system 100 also includes a dual bus memory controller 102, which connects to first bus master A via bus line A and a second bus master B or direct memory access (DMA) unit 104 via a second bus line B. The memory controller is further connected to the short term memory or DRAM 106. A protocol is provided that allows dual bus memory controller 102 to snoop across the master busses and to DRAM 106 for attributes on the address/data bus instead of for read data. FIG. 3 illustrates a timing diagram for a first possible snoop in an injected snoop window, which is between clock cycles 6 and 10.

In the timing diagram of FIG. 3 there are shown a clock signal (CLK), a bus request signal (BR__), a bus grant signal (BG__), a transfer start signal (TS__), an address acknowledge signal (AACK__), address or data signal (A/D (0:63)), a bus busy signal (BB__), a transfer acknowledge signal (TA__), an address retry signal (ARTRY__), and a transfer error acknowledge (TEA__). Additional signals are also represented, which include a read address signal (RA), a snoop address signal (SA), and a read data (D0...D3).

During the initial series of signals in the timing diagram, the clock cycle alternates high-low for each clock cycle and a bus request is exerted during the first clock cycle. Midway between the time of the bus request assertion, a signal signifying that the bus has been granted is asserted during the second clock cycle and once the bus request cycle goes back to normal, the transfer start signal is exerted in the third clock cycle. During this third clock cycle, a read address is driven by the processor as represented in the A/D signal. Next, the bus grant ends and the transfer start signal ends upon the beginning of a bus busy signal in the fourth clock cycle. After this assertion of the BB__ signal, and during the fourth clock cycle, a tri-state signal is asserted on the A/D line. Then, in the fifth clock cycle, the transfer start line is tri-stated upon the occurrence of invalid data on the address data line (A/D).

Once an invalid data unit is detected, a snoop is injected in the injected snoop window between clock cycle 6 and 10. At this time, a transfer start signal is asserted and a snooped address is driven by the memory controller on the A/D line. At the end of the transfer start signal in the seventh clock cycle, a transfer acknowledgement is granted on the TA__ line and the memory controller drives the first read data (D0). A second read data (D1) is also driven by the memory controller upon the address retry signal asserted on the ARTRY line by the processor to indicate that the snoop in the sixth clock is a hit. The ARTRY__signal is driven by the processor 10 to indicate that the snoop is a hit. If the snoop is a miss, the signal will not be connected. In the ninth clock cycle, a third read data is driven by the memory controller and then invalid data is sensed in the tenth clock cycle and a transfer acknowledge signal is then deactivated on the TA__ line. In the next clock cycle (cycle 11) a fourth read data is driven by the memory controller. Then, in the twelfth clock cycle, the TS__ line is tri-stated, as is the A/D line, which occurs after a bus busy signal is negated on the BB__ line and the transfer acknowledge signal is negated on the TA__line. In cycle 13, the BB__ line and TA__ are tri-stated, and lastly, in cycle 14, the ARTRY__ line is tri-stated. During this whole time, the address acknowledge line and the transfer error acknowledge lines are inactive.

Figure 4:
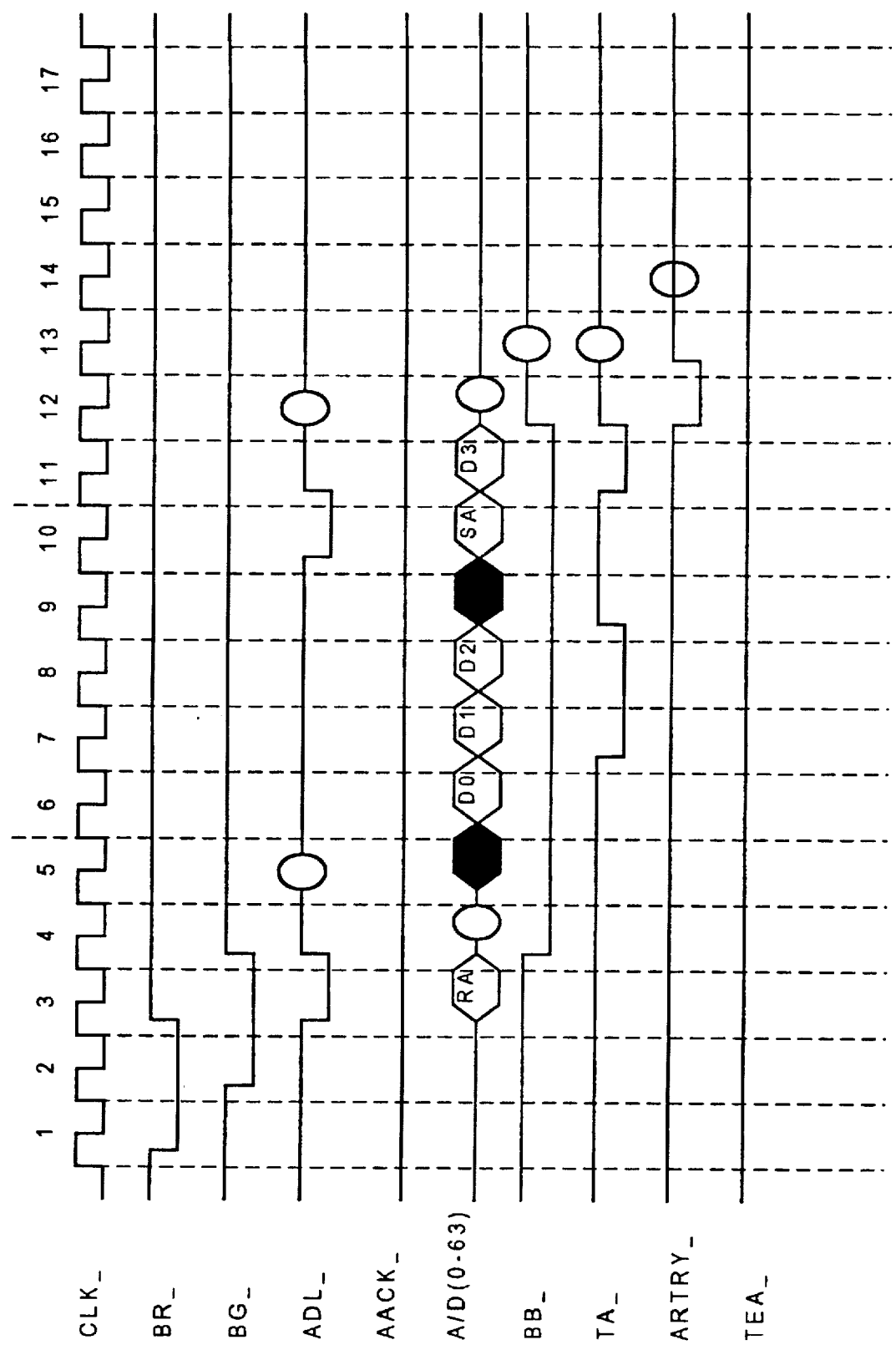
FIG. 4 is a timing diagram of a last snoop performed in the injected snoop window.

FIG. 4 is a timing diagram of a last possible snoop that can be performed in the injected snoop window (clock cycle 6–10). The differences between the timing diagram and this figure and that in the earlier figure for the first snoop in the injected snoop window is that the TA__line must be driven high (negated) on the snoop cycle (clock 10) and the second TS__ pulse is driven by the memory controller. Also, the last snoop possible must be injected before the last read data (D3) is read.

While the invention has been particularly shown and described with reference to a preferred embodiment, it will be understood by those skilled in the art that various changes in form and detail may be made therein without departing from the spirit and scope of the invention.

We claim:

1. In a data processing system having a memory system that includes a dual bus memory controller a method for maintaining memory coherency comprising the steps of:

coupling said dual bus memory controller to both a first bus and a second bus;

snooping across either said first or second bus utilizing said dual bus memory controller for attributes on an address/data multiplex bus in said data processing system; and injecting a snoop address onto said first or second bus during a read transaction utilizing said dual bus memory controller in response to detection of an invalid data unit on said first or second bus.

2. The method according to claim 1 further comprising the steps of:

prior to said snooping step, requesting access of said first or second bus for access by said dual bus memory controller;

granting control of said first or second bus after requesting bus access;

begin transferring data across said first or second bus;

receiving an invalid data signal.

3. The method according to claim 1, wherein said snooping step occurs before a last read data operation is performed.

4. The method according to claim 1, further comprising the step of:

acknowledging a snoop hit has occurred by said processor.

5. A data processing system comprising:

a memory system that includes a dual bus memory controller having a first bus coupled to a first bus master and a second bus coupled to a second bus master;

means for maintaining memory coherency by snooping across either said first or second bus utilizing said dual bus memory controller for attributes on an address/data multiplex bus in said data processing system; and means for injecting a snoop address onto said first or second bus during a read transaction utilizing said dual bus memory controller in response to detection of an invalid data unit on said first or second bus.

6. The system according to claim 5 wherein said maintaining means further comprises:

means for requesting access of said first or second bus for access by said dual bus memory controller.

7. The system according to claim 5 wherein said maintaining means grants control of said first or second bus after requesting bus access and controls transferring data across said first or second bus.

8. The system according to claim 7 wherein said maintaining means grants control of said first or second bus after requesting bus access and begins data transfer upon receipt of an invalid data signal.

* * * * *